US007363032B2

(12) United States Patent
Phillips et al.

(10) Patent No.: US 7,363,032 B2
(45) Date of Patent: Apr. 22, 2008

(54) METHODS AND APPARATUS FOR PROVIDING MANUAL SELECTION OF A COMMUNICATION NETWORK FOR A MOBILE STATION

(75) Inventors: Catherine M. Phillips, Waterloo (CA); Ronald Scotte Zinn, Waterloo (CA); Fraser C. Gibbs, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 430 days.

(21) Appl. No.: 10/776,377

(22) Filed: Feb. 11, 2004

(65) Prior Publication Data

US 2004/0253947 A1 Dec. 16, 2004

(51) Int. Cl.
 *H04Q 7/20* (2006.01)
 *H04M 1/00* (2006.01)
(52) U.S. Cl. .............................. 455/422.1; 455/550.1; 455/424
(58) Field of Classification Search ................ 455/450, 455/510, 552.1, 450.1, 434, 435.2, 558, 422.1, 455/424, 433, 405–407, 455, 466, 456.1, 455/440, 418, 414.1, 550.1, 468; 709/223
 See application file for complete search history.

(56) References Cited

U.S. PATENT DOCUMENTS 6,195,532 B1 2/2001 Bamburak et al.
7,027,813 B2 * 4/2006 Hicks et al. ............. 455/432.1
7,099,687 B1 * 8/2006 Makela et al. ........... 455/552.1
2003/0022689 A1 * 1/2003 McElwain et al. .......... 455/551
2005/0075129 A1 * 4/2005 Kuchibhotla et al. ..... 455/552.1
2005/0091357 A1 * 4/2005 Krantz et al. ............... 709/223
2005/0113088 A1 5/2005 Zinn et al.
2005/0227720 A1 * 10/2005 Gunaratnam et al. ....... 455/510

FOREIGN PATENT DOCUMENTS

FR 2 808 645 A1 11/2001
WO WO 02/067563 A1 8/2002

OTHER PUBLICATIONS

PCT Written Opinion, Feb. 13, 2003, PCT/CA 03/00210.

* cited by examiner

*Primary Examiner*—Naghmeh Mehrpour
(74) *Attorney, Agent, or Firm*—John J. Oskorep, Esq.

(57) ABSTRACT

Methods and apparatus for providing manual selection of a communication network for a mobile station are described. A plurality of communication networks are identified by scanning a coverage area within which the mobile station is operating. A plurality of network identifiers corresponding to the plurality of communication networks are then retrieved from memory of a Subscriber Identity Module (SIM) in accordance with an Enhanced Operator Name String (EONS) protocol. Preferably, each network identifier is retrieved based on a Mobile Country Code (MCC), a Mobile Network Code (MNC), and a Location Area Code (LAC). The plurality of network identifiers are visually displayed for user selection, and at least two of the network identifiers may be substantially the same. The user selected communication network is registered with and the network identifier associated with this network is visually displayed.

24 Claims, 5 Drawing Sheets

METHODS AND APPARATUS FOR PROVIDING MANUAL SELECTION OF A COMMUNICATION NETWORK FOR A MOBILE STATION

CROSS REFERENCE TO RELATED APPLICATION

This application claims the benefit of International Application No. PCT/CA03/00210, filed on Feb. 13, 2003, the entire disclosure of which is incorporated herein by reference.

BACKGROUND

1. Field of the Technology

The present application relates generally to mobile stations and network selection methods employed thereby, and more particularly to manual selection of communication networks by mobile stations.

2. Description of the Related Art

Wireless communication devices, such as mobile stations, have the ability to communicate with other devices (e.g. telephones, servers, personal computers (PCs), etc.) through wireless communication networks. A wireless communication network includes a plurality of base stations, each of which provides near-exclusive communication coverage within a given geographic area. However, more than one wireless network is typically available in many, if not most, geographic regions in a competing fashion. Typically, an end user contracts with and pays to receive communication services exclusively from a single wireless network for a limited period of time (e.g. one year).

Although different networks are available, a mobile station automatically selects and registers with the contracted or preferred network for operation. The name of the network within which the mobile station is operating (e.g. "Cingular" or "AT&T Wireless") is typically displayed on its visual display. This name may be obtained and displayed in accordance with what is known as an "Operator Named String" (ONS) procedure. The mobile station typically receives a Mobile Country Code (MCC) and a Mobile Network Code (MNC) from the network that it registers with, and retrieves and displays a network identifier name from memory of a Subscriber Identity Module (SIM) which corresponds to the unique MCC and MNC combination. A SIM is one type of "smart card" which includes a small processor and memory, and is connected to the mobile station for customization and for identifying the end user.

In addition to this automatic network selection method, a mobile station may provide a method which allows the end user to manually select an available network. Here, the mobile station scans to identify a plurality of communication networks in a coverage area within which the mobile station is operating, retrieves a plurality of network identifiers corresponding to the plurality of communication networks from memory of the SIM, visually displays the plurality of network identifiers, and awaits entry of the manually selected network by the end user.

Although exclusive service agreements typically exist between the subscriber and the network, competing wireless networks have established relationships whereby mobile stations can receive services through other networks when necessary or desired. For example, when a mobile station is located in a geographic region where the contracted wireless network has not established any infrastructure, the mobile station may receive services and communicate through a different (and perhaps competing) network. Network relationships are basically arranged in one of two ways: (1) competitive but necessary; or (2) cooperative and desirable. In a more competitive network relationship, the subscriber is likely to incur additional service charges (e.g. "roaming" charges) for the above-scenario. In a more cooperative network relationship, however, the subscriber is likely to incur standard charges for the above-scenario.

Consider the scenario where two different networks have a cooperative agreement as described above and little or no additional charges are incurred by use of the other's network. Per ONS, a network name different from the contracted network name may be displayed on the mobile station. This is often confusing to a subscriber who may believe that, for example, roaming charges are being incurred when in fact they are not. Recently there has been a shift to provide an alternative network naming method for automatic network selection, referred to as "Enhanced Operator Named String" (EONS) procedure. One purpose of this relatively new procedure is to reduce network naming confusion created in scenarios like the one described above. Instead of displaying a network name that is different from the contracted network name for the above-scenario, the same or substantially similar network name may be displayed even though a different network is actually being used.

However, there is no known procedure described for manual network selection. Continued use of ONS for manual selection may be preferred from the standpoint of identifying the actual network which provides better services. On the other hand, subscribers often prefer transparency and simplification of operation and desire to understand when additional service charges may be incurred. Accordingly, there is a resulting need for improved methods and apparatus of providing manual selection of a communication network for a mobile station.

SUMMARY

Methods and apparatus for providing a manual selection of a communication network for a mobile station are described. In one illustrative embodiment, a plurality of communication networks are identified by scanning a coverage area within which the mobile station is operating. A plurality of network identifiers corresponding to the plurality of communication networks are then retrieved from memory of a Subscriber Identity Module (SIM) in accordance with an Enhanced Operator Name String (EONS) procedure. Preferably, each network identifier is retrieved based on a Mobile Country Code (MCC), a Mobile Network Code (MNC), and a Location Area Code (LAC). The plurality of network identifiers are then simultaneously visually displayed for user selection, where at least two of the network identifiers are substantially identical. The user selected communication network is registered with and the network identifier associated with this network, retrieved in accordance with EONS, is visually displayed. Advantageously, EONS-based identifiers which reflect prearranged network agreements are displayed for end user manual network selection, providing consistency and awareness of which networks may or may not be subject to additional charges.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Figure 1:
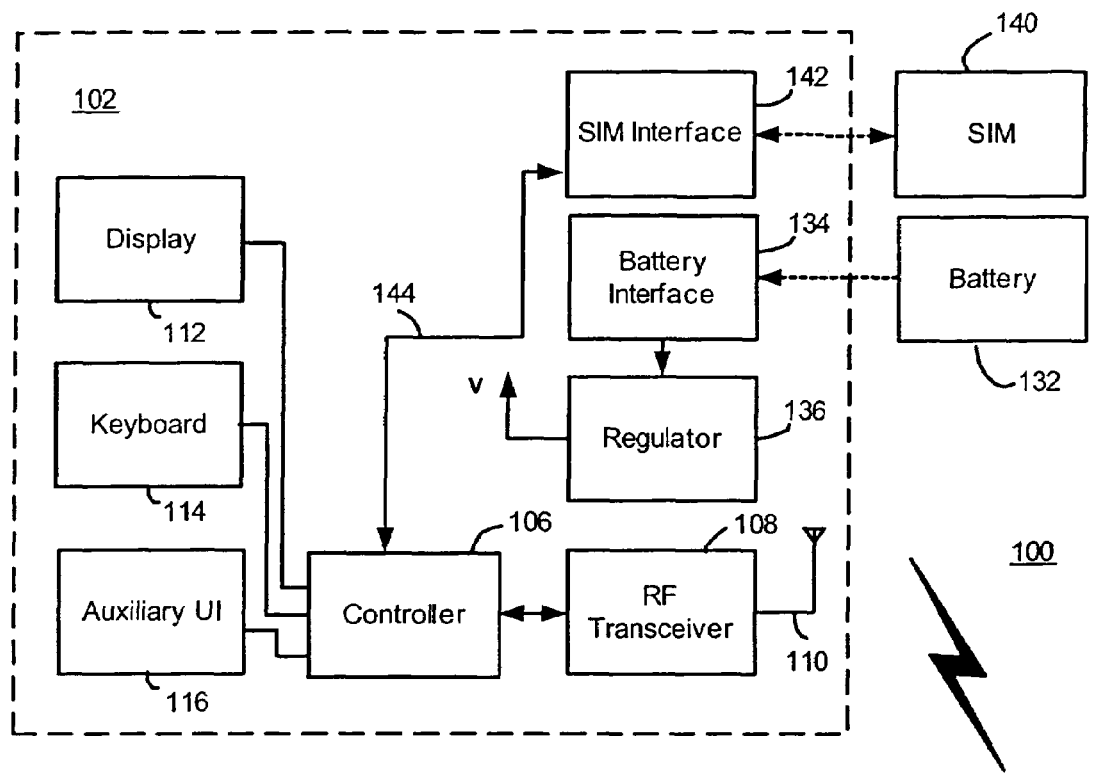
FIG. 1 is a block diagram of a communication system which includes a wireless communication device for communicating in a wireless communication network.
Figure 1:
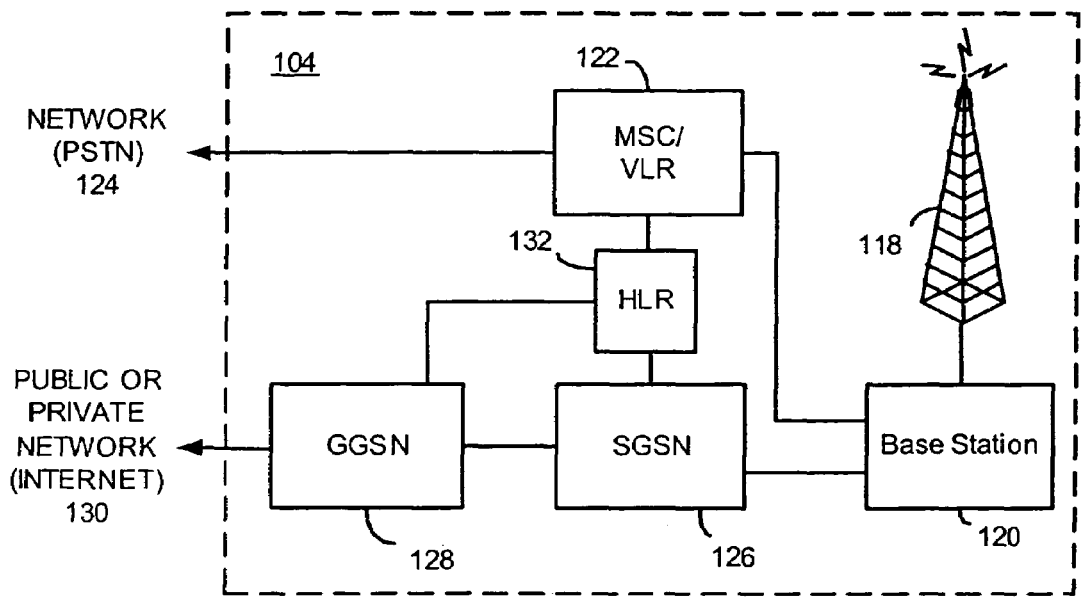

FIG. 1 is a block diagram of a communication system 100 which includes a wireless communication device 102 which communicates through a wireless communication network 104. Wireless communication device 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modem communication devices, controller 106 is embodied as a central processing unit (CPU) which runs operating system software in a memory component (not shown). Controller 106 normally controls overall operation of wireless device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different user inputs.

Wireless device 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 is adapted to particular wireless network or networks in which wireless device 102 is intended to operate.

Wireless device 102 includes a battery interface 134 for receiving one or more rechargeable batteries 132. Battery 132 provides electrical power to most, if not all, electrical circuitry in wireless device 102, and battery interface 132 provides for a mechanical and electrical connection to the battery 132. Battery interface 132 is coupled to a regulator 136 which regulates power for the device. When wireless device 102 is fully operational, an RF transmitter of RF transceiver circuitry 108 is typically keyed or turned on only when it is sending to network, and is otherwise turned off to conserve resources. Such intermittent operation of transmitter has a dramatic effect on power consumption of wireless device 102. Similarly, an RF receiver of RF transceiver circuitry 108 is typically periodically turned off to conserve power until it is needed to receive signals or information, if at all, during designated time periods.

Wireless device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 202 of FIG. 2.

Wireless device 102 operates using a Subscriber Identity Module (SIM) which is connected to or inserted in wireless device 102 at a SIM interface 142. SIM 140 is one type of a conventional "smart card" used to identify an end user (or subscriber) of wireless device 102 and to personalize the device, among other things. Without SIM 140, the wireless device is not fully operational for communication through wireless network 104. By inserting SIM 140 into wireless device 102, an end user can have access to any and all of his/her subscribed services. In order to identify the subscriber, SIM 140 contains some user parameters such as an International Mobile Subscriber Identity (IMSI). In addition, SIM 140 is typically protected by a four-digit Personal Identification Number (PIN) which is stored therein and known only by the end user. An advantage of using SIM 140 is that end users are not necessarily bound by any single physical wireless device. Typically, the only element that personalizes a wireless device terminal is a SIM card. Therefore, the user can access subscribed services using any wireless device equipped to operate with the user's SIM.

SIM 140 generally includes a processor and memory for storing information. SIM and its interfacing standards are well known. For interfacing with a standard GSM device having SIM interface 142, a conventional SIM 140 has six (6) connections. A typical SIM 140 stores all of the following information: (1) an International Mobile Subscriber Identity (IMSI); (2) an individual subscriber's authentication key (Ki); (3) a ciphering key generating algorithm (A8)—with Ki and RAND it generates a 64-bit key (Kc); (4) an authentication algorithm (A3)—with Ki and RAND it generates a 32-bit signed response (SRED); (5) a user PIN code (1 & 2); (6) a PUK code (1 & 2) (this is also referred to as the SPIN); (7) a user phone book; (8) stored Short Message Service (SMS) messages; and (9) a preferred network list. SIM 140 may store additional user information for the wireless device as well, including datebook (or calendar) information and recent call information. As apparent, some of the information stored on SIM 140 (e.g. address book information and SMS messages) is initially received at wireless device 102 over wireless network 104 through its RF transceiver circuitry 108, or received from the end user through keyboard 114.

Some information stored on SIM 140 (e.g. address book and SMS messages) may be retrieved and visually displayed on display 112. Wireless device 102 has one or more software applications which are executed by controller 144 to facilitate the information stored on SIM 140 to be displayed on display 112. Controller 144 and SIM interface 142 have data and control lines 144 coupled therebetween to facilitate the transfer of the information between controller 144 and SIM interface 142 so that it may be visually displayed. An end user enters user input signals at keyboard 114, for example, and in response, controller 144 controls SIM interface 142 and SIM 140 to retrieve the information for display. The end user may also enter user input signals at keyboard 114, for example, and, in response, controller 144 controls SIM interface 142 and SIM 140 to store information on SIM 140 for later retrieval and viewing. Preferably, the software applications executed by controller 106 include an application to retrieve and display address book information stored on SIM 140, and an application to retrieve and display SMS message information stored on SIM 140.

In addition, SIM 140 includes information and files for Enhanced Operator Named String (EONS). EONS requires that two files be stored on SIM 140. The first file includes a list of address pointers corresponding to combinations of Mobile Country Code (MCC), Mobile Network Code (MNC), and Location Area Code (LAC). The address pointers are used to locate network names or identifiers stored in a list in the second file. EONS is described in, for example, 3GPP 51.001 Specifications of the SIM-ME Interface R4 (v4.2.0 or later).

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and to GGSN 128, which is in turn coupled to a public or private data network 130 (such as the Internet). HLR 132 is coupled to MSC 122, SGSN 126, and GGSN 128.

Base station 120, including its associated controller and antenna tower 118, provides wireless network coverage for a particular coverage area commonly referred to as a "cell". Base station 120 transmits communication signals to and receives communication signals from wireless devices within its cell via antenna tower 118. Base station 120 normally performs such functions as modulation and possibly encoding and/or encryption of signals to be transmitted to the wireless device in accordance with particular, usually predetermined, communication protocols and parameters, under control of its controller. Base station 120 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless device 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all wireless device's 102 registered with a network operator, permanent data (such as wireless device 102 user's profile) as well as temporary data (such as wireless device's 102 current location) are stored in HLR 132. In case of a voice call to wireless device 102, HLR 132 is queried to determine the current location of wireless device 102. A Visitor Location Register (VLR) of MSC 122 is responsible for a group of location areas and stores the data of those wireless devices that are currently in its area of responsibility. This includes parts of the permanent wireless device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of wireless devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by base station 120 instructing wireless device 102 to select a particular cell. Wireless device 102 informs wireless network 104 when it reselects another cell or group of cells, known as a routing area.

In order to access GPRS services, wireless device 102 first makes its presence known to wireless network 104 by performing what is known as a GPRS "attach". This operation establishes a logical link between wireless device 102 and SGSN 126 and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to GGSN 128; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and GGSN 128.

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviors at the wireless link.

Figure 2:
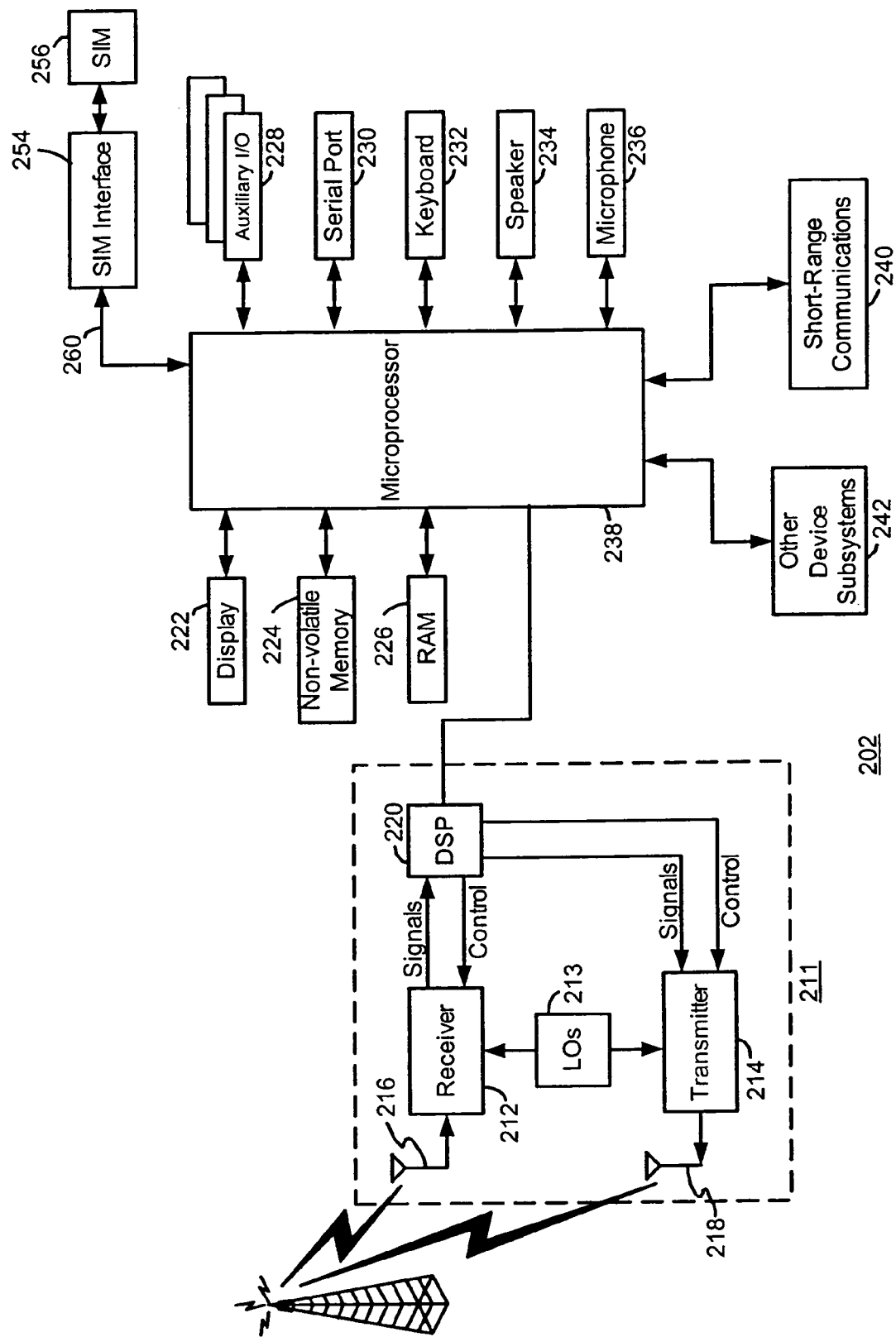
FIG. 2 is a more detailed example of a wireless communication device for use in the wireless communication network.

FIG. 2 is a detailed block diagram of a preferred wireless communication device 202. Wireless device 202 is preferably a two-way communication device having at least voice and data communication capabilities, including the capability to communicate with other computer systems. Depending on the functionality provided by wireless device 202, it may be referred to as a data messaging device, a two-way pager, a cellular telephone with data messaging capabilities, a wireless Internet appliance, or a data communication device (with or without telephony capabilities). Wireless device 202 may be a mobile station, as it is in a preferred embodiment.

If wireless device 202 is enabled for two-way communication, it normally incorporates a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which wireless device 202 is intended to operate.

Network access requirements will also vary depending upon type of network utilized. In GPRS networks, for example, network access is associated with a subscriber or user of wireless device 202. A GPRS device therefore requires a Subscriber Identity Module, commonly referred to as a "SIM" card 256, in order to operate on the GPRS network. Without such a SIM card 256, a GPRS device will not be fully functional. Local or non-network communication functions, if any, may be operable, but wireless device 202 will be unable to carry out its full range of functions involving communications over the network. SIM 256 includes those features described in relation to FIG. 1. In particular, SIM 256 includes information and files for Enhanced Operator Named String (EONS). As described earlier, EONS requires that two files be stored on SIM 256. The first file includes a list of address pointers corresponding to combinations of Mobile Country Code (MCC), Mobile Network Code (MNC), and Location Area Code (LAC). The address pointers are used to locate network names or identifiers stored in a list in the second file. EONS is described in, for example, 3GPP 51.001 Specifications of the SIM-ME Interface R4 (v4.2.0 or later).

Wireless device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Wireless device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a non-volatile memory 224, a random access memory (RAM) 226, auxiliary input/output (I/O) subsystems 228, a serial port 230, a keyboard 232, a speaker 234, a microphone 236, a short-range communications subsystem 240, and other device subsystems generally designated at 242. Data and control lines 260 extend between SIM interface 254 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as the non-volatile memory 224, which may, for example, be a flash memory, a battery backed-up RAM or similar storage element. Those skilled in the art will appreciate that the operating system, specific device applications, or parts thereof, may be temporarily loaded into a volatile store such as RAM 226.

Microprocessor 238, in addition to its operating system functions, preferably enables execution of software applications on wireless device 202. A predetermined set of applications which control basic device operations, including at least data and voice communication applications (such as a network re-establishment scheme), will normally be installed on wireless device 202 during its manufacture. A preferred application that may be loaded onto wireless device 202 may be a personal information manager (PIM) application having the ability to organize and manage data items relating to user such as, but not limited to, e-mail, calendar events, voice mails, appointments, and task items. Naturally, one or more memory stores are available on wireless device 202 and SIM 256 to facilitate storage of PI data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on wireless device 202 with respect to such items. This is especially advantageous where the host computer system is the wireless device user's office computer system. Additional applications may also be loaded onto wireless device 202 through network, an auxiliary I/O subsystem 228, serial port 230, short-range communications subsystem 240, or any other suitable subsystem 242, and installed by a user in RAM 226 or preferably the non-volatile memory 224 for execution by microprocessor 238. Such flexibility in application installation increases the functionality of wireless device 202 and may provide enhanced on-device functions, communication-related functions, or both. For example, secure communication applications may enable electronic commerce functions and other such financial transactions to be performed using wireless device 202.

In a data communication mode, a received signal such as a text message or web page download is processed by communication subsystem 211 and input to microprocessor 238. Microprocessor 238 preferably further processes the signal for output to display 222 or alternatively to auxiliary I/O device 228. A user of wireless device 202 may also compose data items, such as e-mail messages or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of wireless device 202 is substantially similar, except that the received signals would be output to speaker 234 and signals for transmission would be generated by microphone 236. Alternative voice or audio I/O subsystems, such as a voice message recording subsystem, may also be implemented on wireless device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to wireless device 202 other than through a wireless communication network. The alternate download path may, for example, be used to load an encryption key onto wireless device 202 through a direct and thus reliable and trusted connection to thereby provide secure device communication.

Short-range communications subsystem 240 of FIG. 2 is an additional optional component which provides for communication between wireless device 202 and different systems or devices, which need not necessarily be similar devices. For example, subsystem 240 may include an infrared device and associated circuits and components, a Bluetooth™ communication module, or an 802.11 communication module to provide for communication with similarly-enabled systems and devices. Bluetooth™ is a registered trademark of Bluetooth SIG, Inc. Those skilled in the art will appreciate that "Bluetooth" and "802.11" refer to sets of specifications, available from the Institute of Electrical and Electronics Engineers (IEEE), relating to wireless personal area networks and wireless local area networks, respectively.

Wireless device 202 also includes a battery interface (such as that described in relation to FIG. 1) for receiving one or more rechargeable batteries. Such a battery provides electrical power to most if not all electrical circuitry in wireless device 202, and the battery interface provides for a mechanical and electrical connection for it. The battery interface is coupled to a regulator which regulates power to all of the circuitry.

Figure 3:
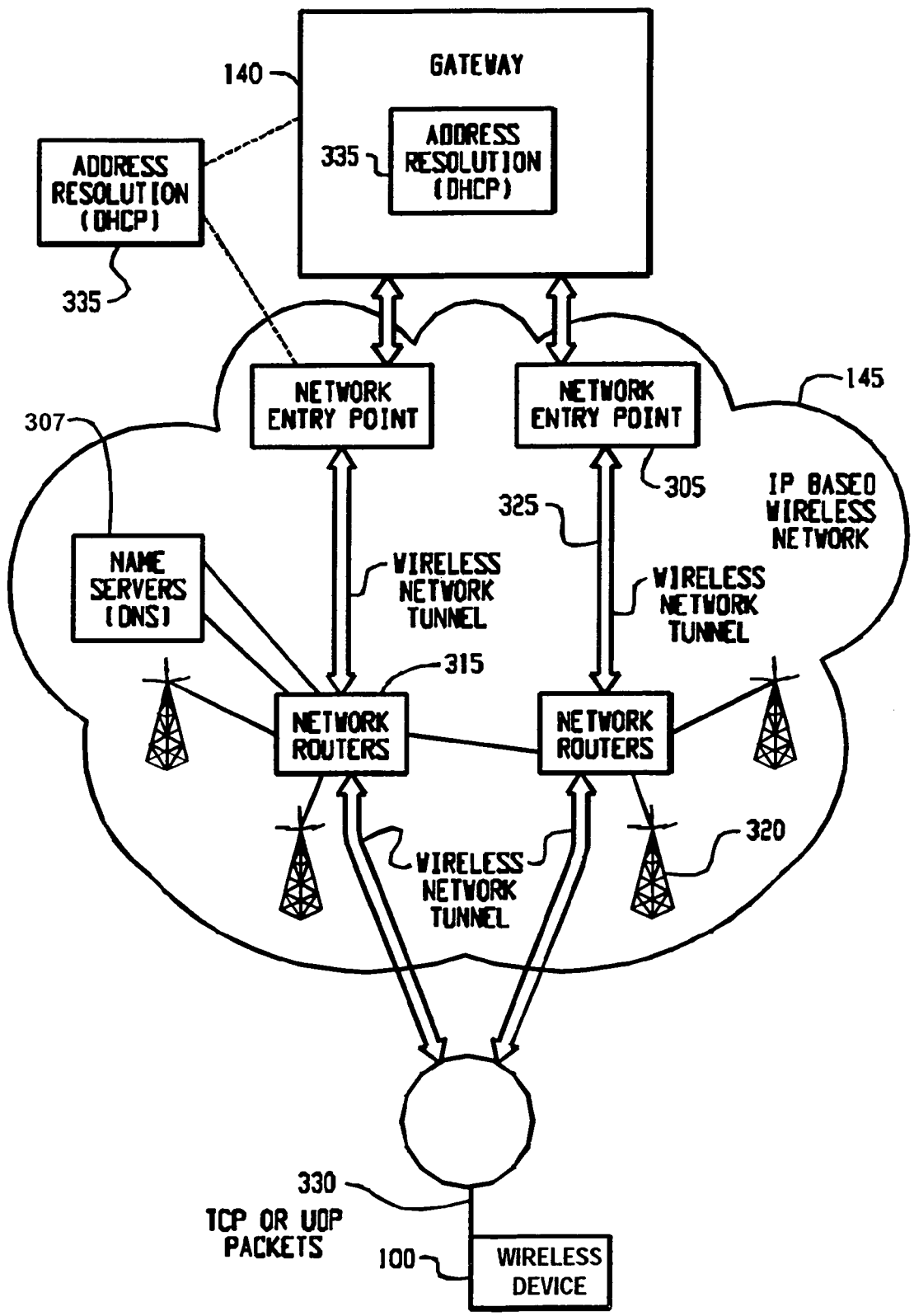
FIG. 3 is a particular structure of a system for communicating with the wireless communication device.

FIG. 3 shows a particular system structure for communicating with a wireless communication device. In particular, FIG. 3 shows basic components of an IP-based wireless data network, such as a GPRS network. A wireless device 100 communicates with a wireless packet data network 145, and may also be capable of communicating with a wireless voice network (not shown). The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components either extend existing GSM components, such as base stations 320, or rely on additional components, such as an advanced Gateway GPRS Service Node (GGSN) as a network entry point 305.

As shown in FIG. 3, a gateway 140 may be coupled to an internal or external address resolution component 335 and one or more network entry points 305. Data packets are transmitted from gateway 140, which is source of information to be transmitted to wireless device 100, through network 145 by setting up a wireless network tunnel 325 from gateway 140 to wireless device 100. In order to create this wireless tunnel 325, a unique network address is associated with wireless device 100. In an IP-based wireless network, however, network addresses are typically not permanently assigned to a particular wireless device 100 but instead are dynamically allocated on an as-needed basis. It is thus preferable for wireless device 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 100.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, wireless device 100 uses a specific technique associated with wireless network 345. The step of opening such a wireless tunnel 325 may require wireless device 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for wireless device 100. When an IP address has been allocated to wireless device 100 and communicated to gateway 140, information can then be forwarded from gateway 140 to wireless device 100.

Wireless tunnel 325 typically has a limited life, depending on wireless device's 100 coverage profile and activity. Wireless network 145 typically tear down wireless tunnel 325 after a certain period of inactivity or out-of-coverage period, in order to recapture resources held by this wireless tunnel 325 for other users. The main reason for this is to reclaim the IP address temporarily reserved for wireless device 100 when wireless tunnel 325 was first opened. Once the IP address is lost and wireless tunnel 325 is torn down, gateway 140 loses all ability to initiate IP data packets to wireless device 100, whether over Transmission Control Protocol (TCP) or over User Datagram Protocol (UDP).

In this application, an "IP-based wireless network" (one specific type of wireless communication network) may include but is not limited to: (1) a Code Division Multiple Access (CDMA) network; (2) a General Packet Radio Service (GPRS) network for use in conjunction with Global System for Mobile Communications (GSM) network; and (3) future third-generation (3G) networks like Enhanced Data rates for GSM Evolution (EDGE) and Universal Mobile Telecommunications System (UMTS). It is to be understood that although particular IP-based wireless networks have been described, the schemes of the present application could be utilized in any suitable type of wireless network.

The infrastructure shown and described in relation to FIG. 3 may be representative of each one of a number of different communication networks which are provided and available in the same geographic region. One of these communication networks is selected by the wireless device, either in an automatic or manual fashion, for communications.

Figure 4:
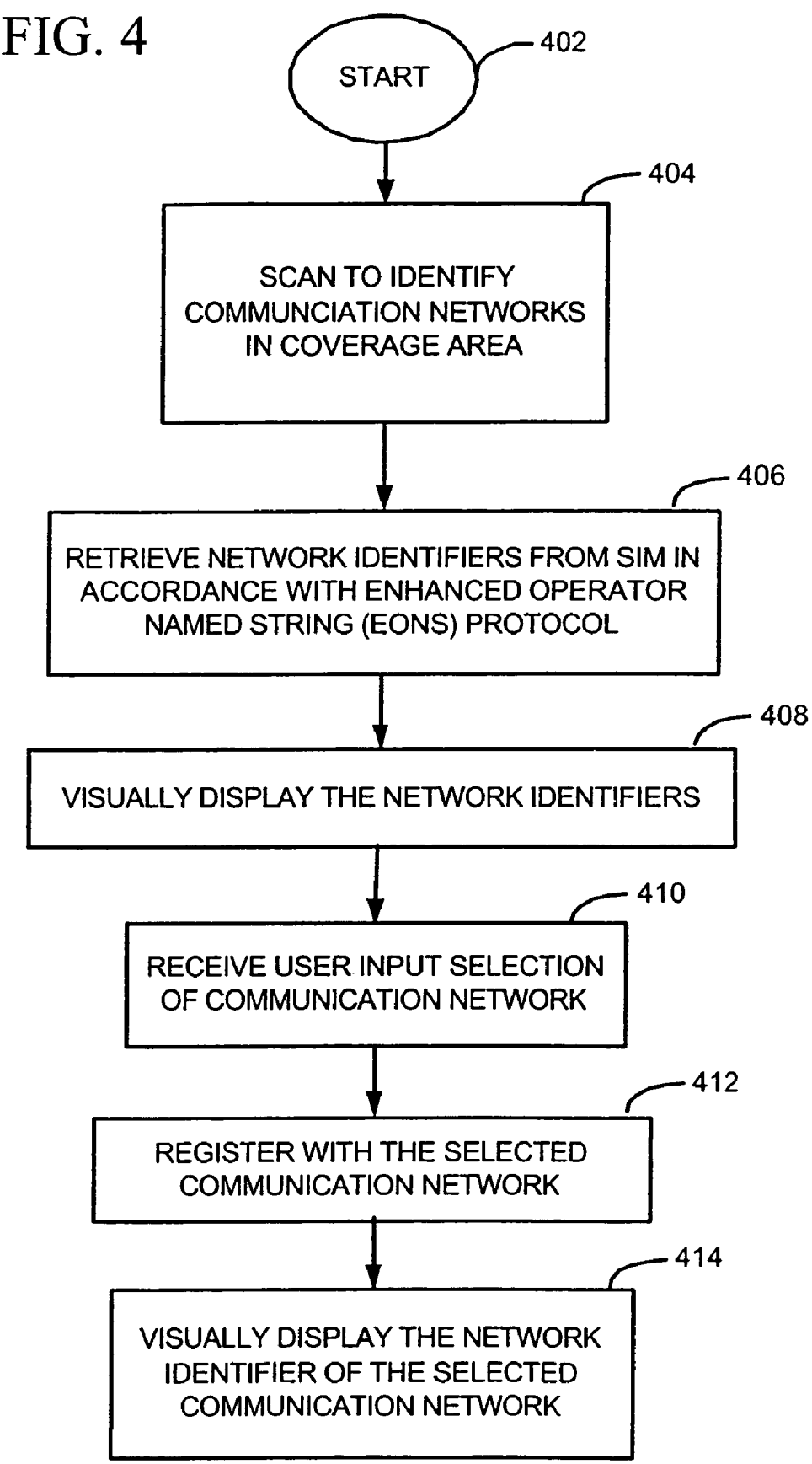
FIG. 4 is a flowchart for describing a method of providing manual selection of a communication network in a mobile station in accordance with the present application.

FIG. 4 is a flowchart for describing a method of providing manual selection of a communication network for a mobile station. Such a method may be employed in connection with components shown and described above in relation to FIGS. 1-3. FIG. 4 relates particularly to a method employed by a mobile station which operates in a wireless communication network within a given coverage area. The flowchart of FIG. 4 will be described in combination with wireless device 202 of FIG. 2.

Initially, an end user of wireless device 202 uses keyboard 232 (or other user interface device) of wireless device 202 to navigate through a menu of features displayed on visual display 222. The end user finds and selects a "manual network selection feature" provided by wireless device 202. Beginning at a start block 402 of FIG. 4, in response to the end-user's selection of the manual network selection feature, wireless device 202 scans the coverage area to identify a plurality of communication networks which are available to operate with wireless device 202 (step 404). From each available network, wireless device 202 receives a Mobile Country Code (MCC), a Mobile Network Code (MNC), and a Location Area Code (LAC). Network identifiers for these communication networks, which are stored on SIM 256, are retrieved in accordance with an Enhanced Operator Named String (EONS) procedure (step 406). At least two of these network identifiers may be the same or substantially identical, which may represent a cooperative relationship between the two different communication networks. The network identifiers for the communication networks are simultaneously visually displayed on display 222 (step 408). Mobile station 202 then prompts the subscriber to manually select a network through which to operate.

Figure 5:
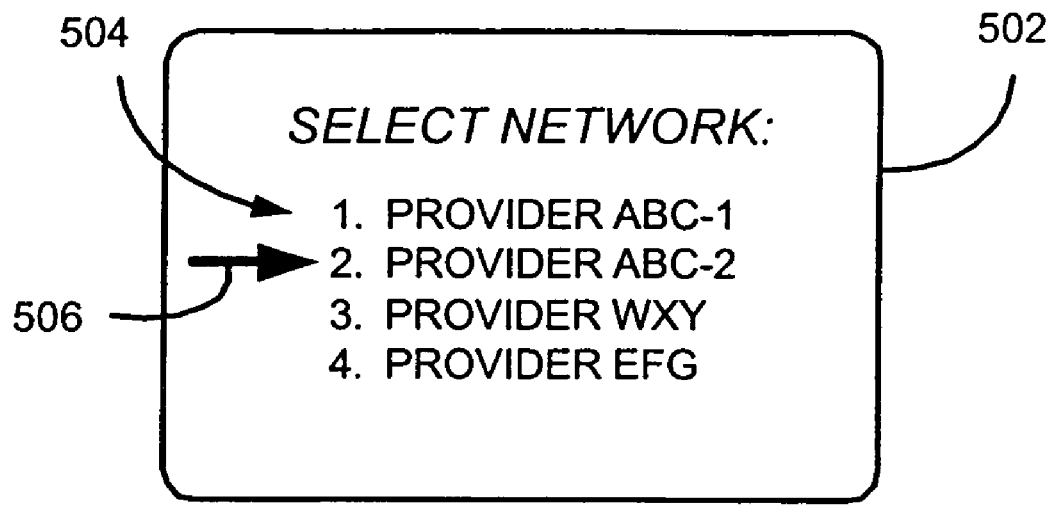
FIG. 5 is an illustration of a visual display of a mobile station, showing a plurality of network identifiers for a plurality of communication networks identified by scanning a coverage area within which a mobile station operates in accordance with the present application.

Referring briefly now to FIG. 5, a visual display 502 of a mobile station is illustrated as displaying a plurality of network identifiers 504 per steps 404-408 of FIG. 4. In particular, there are four (4) network identifiers shown in the example display 502 of FIG. 5, including "PROVIDER ABC-1", "PROVIDER ABC-2", "PROVIDER WXY", and "PROVIDER EFG". Service provider ABC is represented by the network identifier "PROVIDER ABC-1". "PROVIDER ABC-2" represents a network that is owned and operated separately from service provider ABC, although a cooperative relationship exists between these two otherwise different networks. As apparent, these first two network identifiers "PROVIDER ABC-1" and "PROVIDER ABC-2" are substantially identical. The other network identifiers are different from each other. In a typical scenario, the subscriber will incur the same standard charges whether PROVIDER ABC-1 or PROVIDER ABC-2 is selected. A visually displayed cursor prompt 506 or other mechanism is used to provide feedback to the subscriber on which network will be selected.

Referring back to the flowchart of FIG. 4, mobile station 202 receives a user input selection of a desired communication network through its user interface (e.g. keyboard 232) (step 410). In response, mobile station 202 uses its microprocessor 238 and communication subsystem 211 to register with the communication network corresponding to the selected network identifier (step 412). Mobile station 202 may perform any other conventional task(s) required to operate as desired within the selected network. Finally, mobile station 202 visually displays the network identifier of the selected communication network in visual display 222 (step 414). In step 414, mobile station 202 may merely copy the network identifier already obtained via step 408, or alternatively may retrieve it again from memory of SIM 256 per EONS using the parameters previously described. Mobile station 202 then operates in the selected communication network in a steady-state idle mode.

Figure 6:
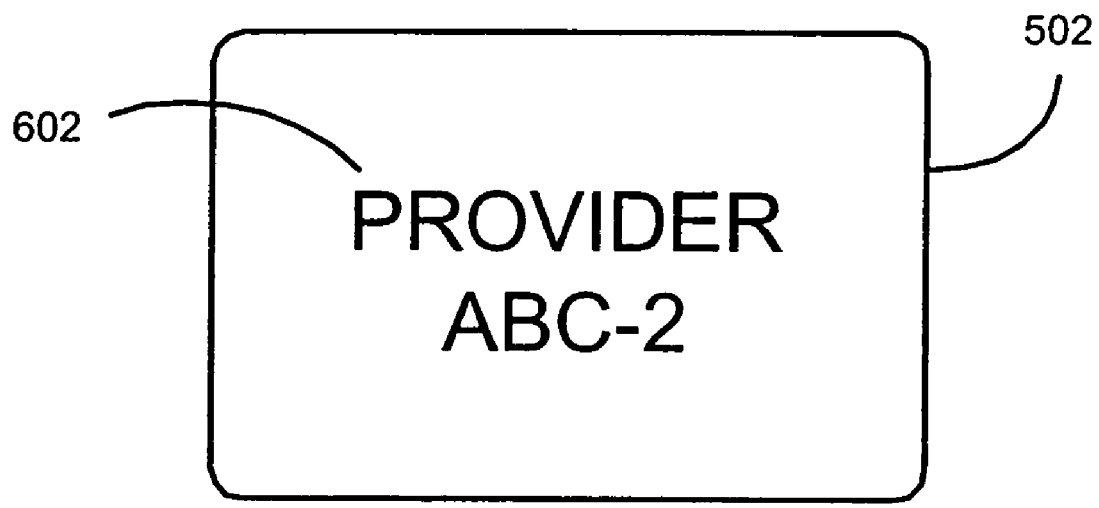
FIG. 6 is an illustration of the visual display of FIG. 5, showing a network identifier of a manually selected communication network according to the present application.

Referring briefly now to FIG. 6, visual display 502 is illustrated as displaying the selected network identifier corresponding to the network manually selected per steps 410-414 of FIG. 4. In particular, the network identifier shown is "PROVIDER ABC-2". In this particular example, network services are not actually provided by service provider ABC but rather by a separately owned and operated network which has a cooperative relationship therewith. In a typical scenario, the subscriber incurs standard charges with use of PROVIDER ABC-2, the same as with PROVIDER ABC-1. In the most preferred operation, EONS is also used by mobile station 202 for automatic network selection.

Thus, methods and apparatus for manually selecting a communication network in a mobile station have been described. In one illustrative example, the inventive method includes the acts of scanning to identify a plurality of communication networks in a coverage area within which the mobile station is operating; retrieving, from memory of a Subscriber Identity Module (SIM), a plurality of network identifiers corresponding to the plurality of communication networks in accordance with an Enhanced Operator Name String (EONS) protocol; wherein each network identifier is retrieved based on a Mobile Country Code (MCC), a Mobile Network Code (MNC), and a Location Area Code (LAC); simultaneously visually displaying the plurality of network identifiers, including at least two network identifiers that are substantially identical; receiving a user input selection of one of the communication networks after visually displaying the plurality of network identifiers; registering with the selected communication network; and visually displaying the network identifier associated with the selected communication network.

An inventive mobile station includes a transceiver operative to scan to identify a plurality of communication networks in a coverage area within which the mobile station is operating; a Subscriber Identity Module (SIM) interface configured to receive a SIM; a processor operative to retrieve, through the SIM interface, a plurality of network identifiers corresponding to the plurality of communication networks in accordance with an Enhanced Operator Name String (EONS) protocol; the processor being further operative to retrieve each network identifier based on a Mobile Country Code (MCC), a Mobile Network Code (MNC), and a Location Area Code (LAC); a visual display operative to simultaneously visually display the plurality of network identifiers; the processor being further operative to receive a user input selection of one of the communication networks after visually displaying the plurality of network identifiers; the transceiver being further operative to register with the selected communication network; and the visual display being further operative to visually display the network identifier corresponding to the selected communication network.

Advantageously, EONS-based identifiers which reflect pre-arranged network agreements are displayed for end user manual network selection, providing consistency and awareness of which networks may or may not be subject to additional charges. In addition, location-based name retrieval provides a more accurate assessment of the actual network available.

The above-described embodiments of invention are intended to be examples only. Alterations, modifications, and variations may be effected to particular embodiments by those of skill in art without departing from scope of invention, which is defined solely by claims appended hereto.

The invention claimed is:

1. In a mobile station, a method for use in manually selecting a communication network comprising:
   receiving, through a user interface of the mobile station, an end user input to perform a manual network selection procedure;
   in the manual network selection procedure:
      scanning to identify a plurality of communication networks in a coverage area within which the mobile station is operating;
      retrieving a plurality of network identifiers corresponding to the plurality of identified communication networks in accordance with an Enhanced Operator Name String (EONS) protocol;
      visually displaying the plurality of network identifiers retrieved in accordance with the EONS protocol;
      receiving, through the user interface, a user input selection of one of the identified communication networks as represented by the plurality of network identifiers being visually displayed; and
      registering with the selected communication network corresponding to the user input selection.

2. The method of claim 1, wherein the act of retrieving comprises retrieving each network identifier based on a country code, a region code, and a cell number.

3. The method of claim 1, wherein the act of retrieving comprises retrieving each network identifier based on a Mobile Country Code (MCC), a Mobile Network Code (MNC), and a Location Area Code (LAC).

4. The method of claim 1, wherein the plurality of network identifiers comprises at least two network identifiers that are substantially the same.

5. The method of claim 1, wherein the act of retrieving comprises retrieving from memory of a Subscriber Identity Module (SIM).

6. The method of claim 1, further comprising:
   visually displaying the network identifier corresponding to the selected communication network.

7. The method of claim 1, wherein the act of retrieving comprises retrieving from memory of a Subscriber Identity Module (SIM) based on a Mobile Country Code (MCC), a Mobile Network Code (MNC), and a Location Area Code (LAC), further comprising:
   visually displaying the network identifier corresponding to the selected communication network.

8. The method of claim 1, wherein the mobile station comprises a Global System for Mobile (GSM) and General Packet Radio Service (GPRS) compatible mobile station.

9. The method of claim 1, comprising the further act of:
   providing an automatic network selection method based on the EONS protocol.

10. A mobile station, comprising:
    a user interface;
    a processor coupled to the user interface;
    the processor being operative to receive, through the user interface, an end user input to perform a manual network selection procedure;
    a transceiver being operative to scan, during the manual network selection procedure, to identify a plurality of communication networks in a coverage area within which the mobile station is operating;
    the processor being further operative to retrieve, during the manual network selection procedure, a plurality of network identifiers corresponding to the plurality of identified communication networks in accordance with an Enhanced Operator Name String (EONS) protocol;
    a visual display being operative to visually display, during the manual network selection procedure, the plurality of network identifiers retrieved in accordance with the EONS protocol;
    the processor being further operative to receive, through the user interface during the manual network selection procedure, a user input selection of one of the identified communication networks as represented by the plurality of network identifiers being visually displayed; and
    the transceiver being further operative to register with the selected communication network corresponding to the user input selection.

11. The mobile station of claim 10, wherein the processor is further operative to retrieve each network identifier based on a country code, a region code, and a cell number.

12. The mobile station of claim 10, wherein the processor is further operative to retrieve each network identifier based a Mobile Country Code (MCC), a Mobile Network Code (MNC), and a Location Area Code (LAC).

13. The mobile station of claim 10, wherein the processor and the visual display are operative to retrieve and visually display, respectively, at least two network identifiers that are substantially the same.

14. The mobile station of claim 10, further comprising:
a Subscriber Identity Module (SIM) interface through which the processor is operative to retrieve the plurality of network identifiers.

15. The mobile station of claim 10, wherein the visual display is further operative to visually display the network identifier corresponding to the selected communication network.

16. The mobile station of claim 15, wherein the processor is further operative to retrieve each network identifier based a Mobile Country Code (MCC), a Mobile Network Code (MNC), and a Location Area Code (LAC).

17. The mobile station of claim 10, further comprising:
a Subscriber Identity Module (SIM) interface through which the processor is operative to retrieve the plurality of network identifiers;
wherein the processor is further operative to retrieve each network identifier through the SIM interface based a Mobile Country Code (MCC), a Mobile Network Code (MNC), and a Location Area Code (LAC); and
wherein the visual display is further operative to visually display the network identifier corresponding to the selected communication network.

18. The mobile station of claim 10, further comprising a Global System for Mobile (GSM) and General Packet Radio Service (GPRS) compatible mobile station.

19. A method of manually selecting a communication network in a mobile station comprising the acts of:
scanning to identify a plurality of communication networks in a coverage area within which the mobile station is operating;
retrieving, from memory of a Subscriber Identity Module (SIM), a plurality of network identifiers corresponding to the plurality of communication networks in accordance with an Enhanced Operator Name String (EONS) protocol;
wherein each network identifier is retrieved based on a Mobile Country Code (MCC), a Mobile Network Code (MNC), and a Location Area Code (LAC);
in a manual network selection technique:
simultaneously visually displaying the plurality of network identifiers, including at least two network identifiers that are substantially identical;
receiving a user input selection of one of the communication networks after visually displaying the plurality of network identifiers;
registering with the selected communication network; and
visually displaying the network identifier associated with the selected communication network.

20. The method of claim 19, wherein the mobile station comprises a Global System for Mobile (GSM) and General Packet Radio Service (GPRS) compatible mobile station.

21. A mobile station, comprising:
a transceiver operative to scan to identify a plurality of communication networks in a coverage area within which the mobile station is operating;
a Subscriber Identity Module (SIM) interface configured to receive a SIM;
a processor operative to retrieve, through the SIM interface, a plurality of network identifiers corresponding to the plurality of communication networks in accordance with an Enhanced Operator Name String (EONS) protocol;
the processor being further operative to retrieve each network identifier based on a Mobile Country Code (MCC), a Mobile Network Code (MNC), and a Location Area Code (LAC);
a visual display operative to simultaneously visually display the plurality of network identifiers for manual network selection by an end user;
the processor being further operative to receive a user input selection of one of the communication networks for the manual network selection after visually displaying the plurality of network identifiers;
the transceiver being further operative to register with the selected communication network; and
the visual display being further operative to visually display the network identifier corresponding to the selected communication network.

22. The mobile station of claim 21, comprising a Global System for Mobile (GSM) and General Packet Radio Service (GPRS) compatible mobile station.

23. The mobile station of claim 21, wherein the processor is further operative to retrieve the plurality of network identifiers from memory of the SIM.

24. The mobile station of claim 21, wherein at least two network identifiers which are retrieved and visually displayed are substantially the same.

* * * * *